US006921490B1

(12) United States Patent
Qian et al.

(10) Patent No.: US 6,921,490 B1
(45) Date of Patent: Jul. 26, 2005

(54) OPTICAL COMPONENT HAVING WAVEGUIDES EXTENDING FROM A COMMON REGION

(75) Inventors: Wei Qian, Torrance, CA (US); Dazeng Feng, Arcadia, CA (US); Dawei Zheng, Los Angeles, CA (US); Joan Yiqiong Fong, San Marino, CA (US); Zhian Shao, Torrance, CA (US); Lih-Jou Chung, Anaheim, CA (US); Xiaoming Yin, Pasadena, CA (US)

(73) Assignee: Kotura, Inc., Monterey Park, CA (US)

( * ) Notice: Subject to any disclaimer, the term of this patent is extended or adjusted under 35 U.S.C. 154(b) by 0 days.

(21) Appl. No.: 10/236,505

(22) Filed: Sep. 6, 2002

(51) Int. Cl.[7] .............................................. B29D 11/00
(52) U.S. Cl. ...................................................... 216/24
(58) Field of Search ...................... 216/24, 27; 385/43, 385/45, 46, 39, 50; 430/322, 323, 325, 326

(56) References Cited

U.S. PATENT DOCUMENTS

| | | | | |
|---|---|---|---|---|
| 4,927,781 A | * | 5/1990 | Miller | 438/31 |
| 4,980,268 A | * | 12/1990 | Bartmann et al. | 430/283.1 |
| 5,348,616 A | * | 9/1994 | Hartman et al. | 216/48 |
| 5,364,495 A | * | 11/1994 | Van Der Tol et al. | 438/31 |
| 5,511,142 A | | 4/1996 | Horie et al. | |
| 6,525,296 B2 | * | 2/2003 | Matsushima et al. | 219/121.69 |
| 2003/0044118 A1 | | 3/2003 | Zhou et al. | |
| 2003/0133661 A1 | | 7/2003 | Adibi et al. | |

FOREIGN PATENT DOCUMENTS

| | | |
|---|---|---|
| EP | 0849615 A2 | 6/1998 |
| JP | 11064657 | 3/1999 |

OTHER PUBLICATIONS

Brenner, et al., *Vertical InP/InGaAsP Tapers for Low-Loss Optical Fibre-Waveguide Coupling*, Electronic Letters Oct. 22, 1992 vol. 28, No. 22, pp 20402041.

Dumbravescu, *3-D Resolution Gray-Tone Lithography*, Proceedings of SPIE vol. 4231 (2000), pp 570-577.

Jeon, et al., *Simple Fabrication Method for Vertical Taper Using Tensile Stress Induced Mask and Selective Etching Technique*, CLEO/Pacific Rim '99, pp 320-321.

Kley, et al., *Fabrication and Properties fo Refractive Micro-Optical Profiles for Lenses, Lens Arrays and Beam Shaping Elements*, Proceedings of SPIE vol. 4231 (2000), pp 144-152.

(Continued)

Primary Examiner—Gregory Mills
Assistant Examiner—Roberts Culbert
(74) Attorney, Agent, or Firm—Gavrilovich, Dodd & Lindsey, LLP; Travis Dodd

(57) ABSTRACT

A method of forming an optical component includes forming a first mask on an optical component precursor. The first mask is formed with a plurality of waveguide portions extending from a common portion. Each waveguide portion is positioned so as to protect a waveguide region of the optical component precursor where a waveguide is to be formed. The method also includes forming a second mask between waveguide portions of the first mask. The resistance of the second mask to etching varies along at least one dimension of the second mask.

22 Claims, 14 Drawing Sheets

OTHER PUBLICATIONS

Moerman, et al., *A Review of Fabrication Technologies for the Monolithic Integration of Tapers with III-V Semiconductor Devices*, IEEE Journal of Selected Topics in Quantum Electronics, Dec. 1997, vol. 3-No. 6, pp 1308-1320.

Müller, G. et al., *First Low Loss InP/InGaAsP Optical Switch with Integrated Mode Transformers*; ThC12.10; p. 37-40.

Reimer, et al., *Micro-optic Fabrication Using One-level Gray-Tone Lithography*, SPIE vol. 3008, pp. 279-288.

Reimer, et al., *One Level Gray-Tone Lithography-Mask Data Preparation and Pattern Transfer*, SPIE vol. 2783 pp 71-79.

Rickman, A.G. et al., *Silicon-on-Insulator Optical Rib Waveguide Loss and Mode Characteristics*, Journal of Lightwave Technology, Oct. 1994, vol. 12-No. 10, pp 1771-1776.

Renaud, M. et al., *Compact Digital Optical Switches for Low Insertion Loss Large Switch Arrays on InP*; Proc. 21st Eur.Conf.on Opt. Comm. (ECOC '95-Brussels), p. 99-102.

Sugita, et al., *Very Low Insertion Loss Arrayed-Waveguide Grating with Vertically Tapered Waveguides*, IEEE Photonics Letters, Sep. 2000, vol. 12-No. 9, pp. 1180-1182.

Waits, et al., *MEMS-based Gray-Scale Lithography*, pp 182-185.

* cited by examiner

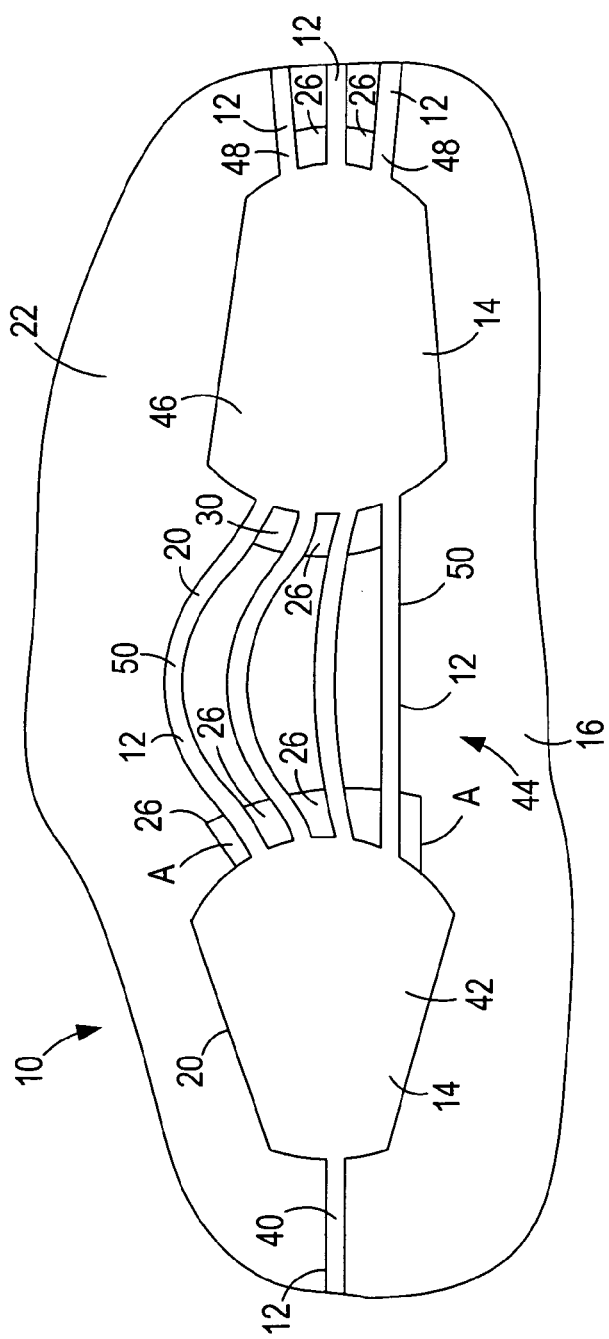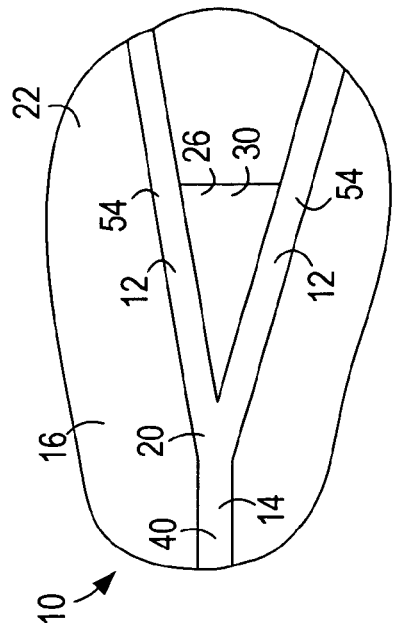
Figure 5A
Figure 5B

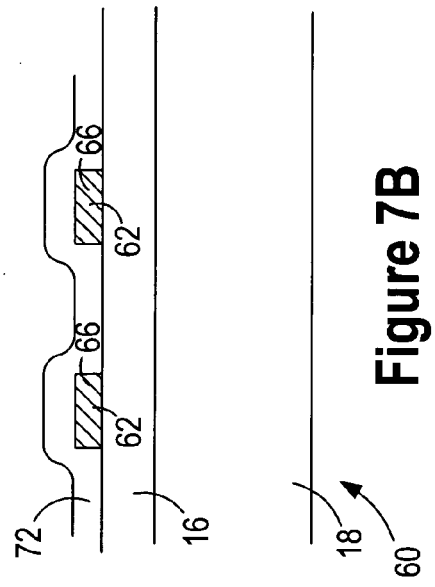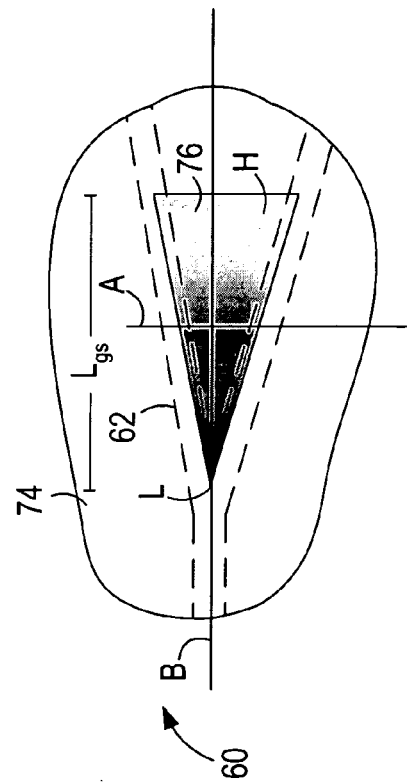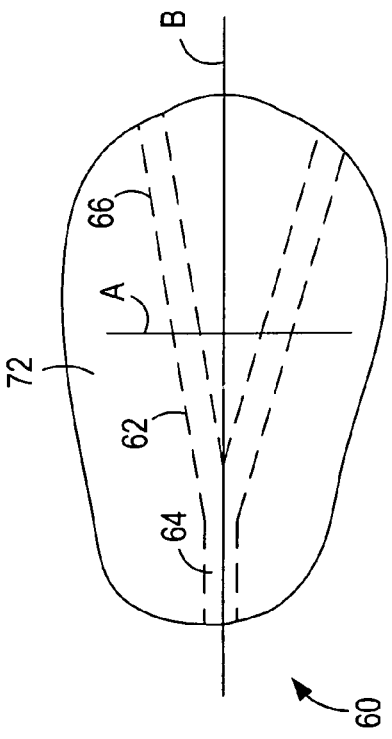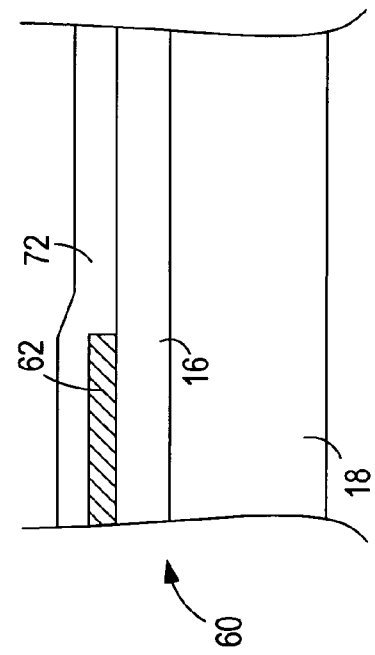
Figure 7A
Figure 7B
Figure 7C
Figure 7D

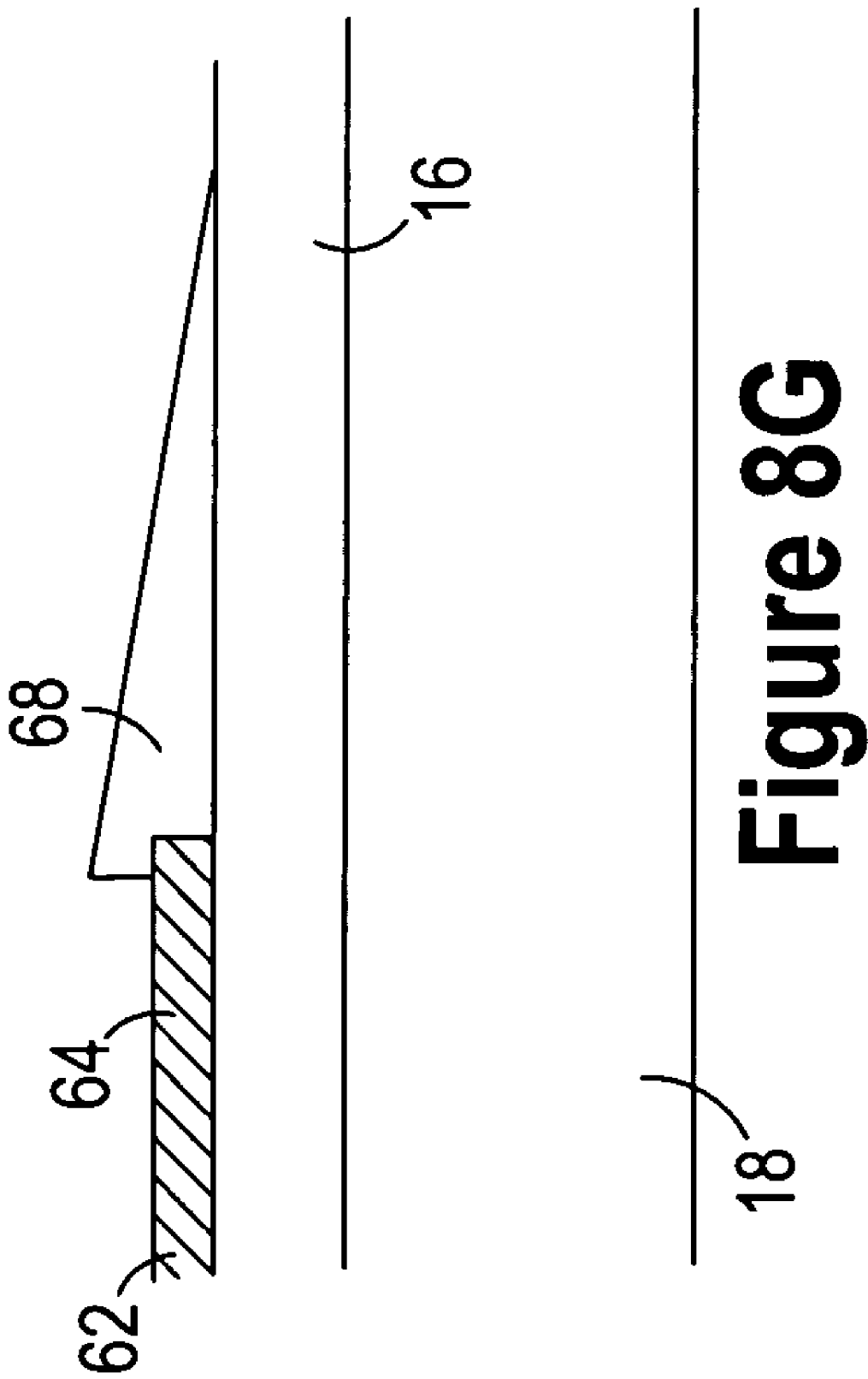

OPTICAL COMPONENT HAVING WAVEGUIDES EXTENDING FROM A COMMON REGION

BACKGROUND

1. Field of the Invention

The invention relates to one or more optical networking components. In particular, the invention relates to optical components having waveguides that extend away from a common region.

2. Background of the Invention

A variety of optical components have waveguides in optical communication with a common region. For instance, many optical components have a y-junction where three waveguides intersect. The y-junction is operated so one of the waveguides serves as an input waveguide and two of the waveguides each serve as an output waveguide. A fraction of a light signal traveling along the input waveguide enters one of the output waveguides and another fraction of the light signal enters the other output waveguide. However, a fraction of the light signal traveling along the input waveguide is incident on the portion of the common region positioned between the output waveguides. This portion of the common region often reflects or scatters the incident fraction of the light signal. As a result, the incident fraction of the light signal is often lost. There is a need for a common region structure associated with a reduced optical loss.

SUMMARY OF THE INVENTION

The invention relates to an optical component. The optical component includes waveguides extending from a common region. The optical component also includes a tapered region extending from the common region between the waveguides. The tapered region has a thickness that tapers in a direction moving away from the common region. The waveguides can be the array waveguides of an array waveguide grating and the common region can be a star coupler connected to the waveguides. The waveguides can also be the output waveguides of a y-junction.

The invention also relates to an optical component precursor from which an optical component is formed. The optical component precursor includes a first mask positioned on the optical component precursor. The first mask includes a plurality of waveguide portions extending from a common portion. Each waveguide portion is positioned to protect a waveguide region of the optical component precursor where a waveguide is to be formed. The optical component precursor also includes a second mask positioned between waveguide portions of the first mask. The resistance of the second mask to etching varies along at least one dimension of the second mask.

The invention also relates to a method of forming an optical component. The method includes etching an optical component precursor so as to form waveguides extending from a common region concurrently with forming a tapered region between the waveguides. The tapered region is formed with a thickness that tapers in a direction moving away from the common region.

An embodiment of a method of forming an optical component precursor includes forming a first mask on an optical component precursor. The first mask is formed with a plurality of waveguide portions extending from a common portion. Each waveguide portion is positioned so as to protect a waveguide region of the optical component precursor where a waveguide is to be formed. The method also includes forming a second mask between waveguide portions of the first mask. The resistance of the second mask to etching varies along at least one dimension of the second mask.

Forming the second mask can include exposing a second mask precursor to light through a gray scale region of a photomask. Alternatively, forming the second mask can include scanning light across a second mask precursor such that the light causes different regions of the second mask precursor to be exposed to more light than other regions of the second mask precursor.

The invention also relates to a method of forming a mask on an optical component precursor. The method includes forming a mask precursor on an optical component precursor and exposing the mask precursor to light such that different regions of the mask precursor receive light for different periods of time. In some instances, exposing the mask precursor to light such that different regions of the mask precursor receive light for different periods of time includes scanning light across the mask precursor.

BRIEF DESCRIPTION OF THE FIGURES

FIG. 5A illustrate a tapered region positioned between waveguides of a demultiplexer.

FIG. 5B illustrate a tapered region positioned between waveguides of a y-junction.

FIG. 7A through FIG. 7I illustrate a method of forming a mask having a resistance to an etch that varies along the length of the mask.

FIG. 8A through FIG. 8G illustrate another method of forming a mask having a resistance to an etch that varies along the length of the mask.

DETAILED DESCRIPTION

The invention relates to an optical component. The optical component includes waveguides extending from a common region. The optical component also includes a tapered region extending from the common region between the waveguides. The tapered region has a thickness that tapers in a direction moving away from the common region. When the tapered region is not present, a light signal incident on the portion of the common region located between the waveguides is reflected or scattered. The taper of the tapered region can be selected such that the light signal is directed into one of the waveguides rather than being scattered or reflected. Because the light signal is directed into a waveguide, the optical component is associated with a reduced level of optical loss compared to prior structures.

Figure 1A:
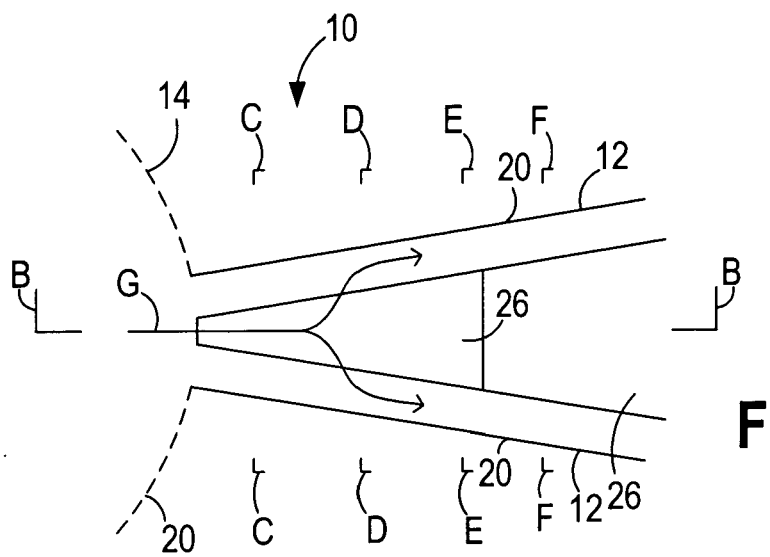
FIG. 1A is a topview of an optical component having a plurality of waveguides extending from a common region. A tapered region extends from the common region between the waveguides. The thickness of the tapered region tapers moving away from the common region.
Figure 1B:
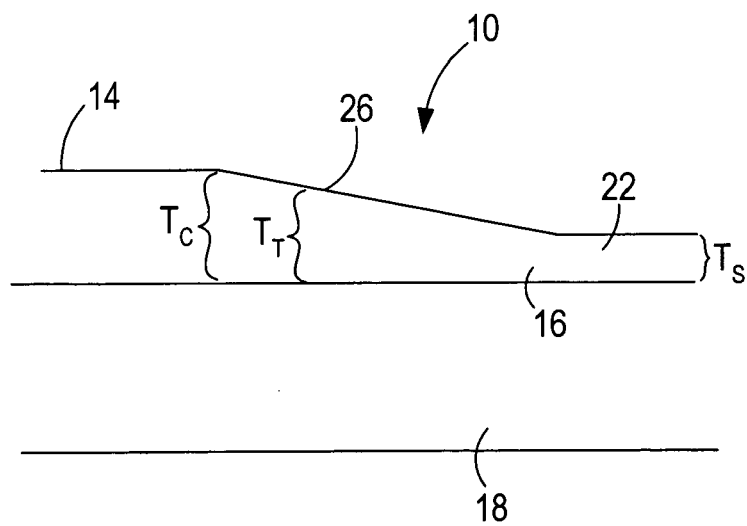
FIG. 1B is a longitudinal cross section of the optical component shown in FIG. 1A taken along a line between the brackets labeled B.
Figure 1C:
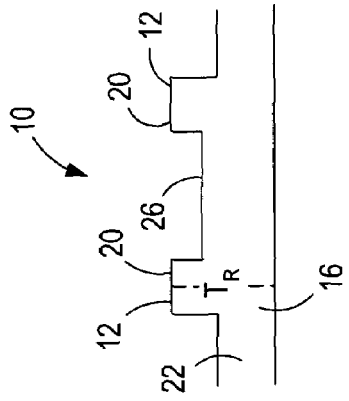
FIG. 1C is a lateral cross section of the optical component in FIG. 1A taken along a line between the brackets labeled C.
Figure 1E:
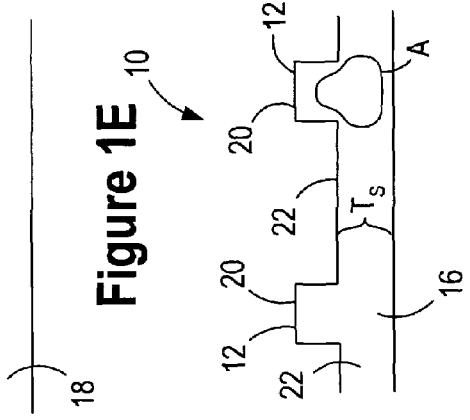
FIG. 1E is a lateral cross section of the optical component in FIG. 1A taken along a line between the brackets labeled E.
Figure 1F:
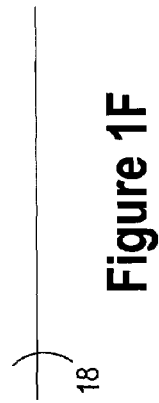
FIG. 1F is a lateral cross section of the optical component in FIG. 1A taken along a line between the brackets labeled F.
Figure 1D:
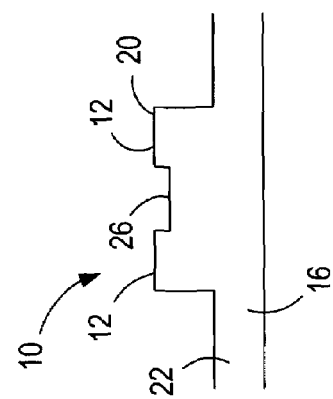
FIG. 1D is a lateral cross section of the optical component in FIG. 1A taken along a line between the brackets labeled 1D.

FIG. 1A through FIG. 1F illustrate an optical component 10 having a plurality of waveguides 12 extending from a common region 14. FIG. 1A is a topview of the optical component 10. FIG. 1B is a longitudinal cross section of the optical component 10. A longitudinal cross section is taken along a line extending between the waveguides 12. For instance, FIG. 1B is a cross section taken along a line between the brackets labeled B. FIG. 1C is a lateral cross section of the optical component 10 taken along a line between the brackets labeled C. FIG. 1D is a lateral cross section of the optical component 10 in FIG. 1A taken along a line between the brackets labeled 1D. FIG. 1E is a lateral cross section of the optical component 10 in FIG. 1A taken along a line between the brackets labeled E. FIG. 1F is a lateral cross section of the optical component 10 in FIG. 1A taken along a line between the brackets labeled F.

The optical component 10 includes a light transmitting medium 16 positioned on a base 18. Suitable light transmitting media include, but are not limited to, silicon. Although not illustrated, a cladding can optionally be positioned on the light transmitting medium 16. The light transmitting medium 16 includes ridges 20 extending from a slab 22. The ridge 20 defines a portion of light signal carrying regions where light signals are constrained in the optical component 10. For instance, the ridge 20 can define a portion of the waveguides 12. The portion of the base 18 adjacent to the light transmitting medium 16 reflects light signals from a light signal carrying region back into the light signal carrying region. As a result, the base 18 defines another portion of the light signal carrying regions and accordingly defines another portion of the waveguides 12. The line labeled A in FIG. 1F illustrates the profile of a light signal constrained in a waveguide 12.

The optical component 10 includes a common region 14 illustrated by the dashed lines in FIG. 1A. The common region 14 can have a variety of shapes including, but not limited to, a star coupler and a waveguide 12. Two waveguides 12 are shown extending from the common region 14. A tapered region 26 also extends from the common region 14 and is positioned between the two waveguides 12. The portion of the common region 14 adjacent to the tapered region 26 has a thickness labeled $T_C$. The ridge 20 has a thickness labeled $T_R$. The common region 14 thickness, $T_C$, is often the same as the ridge 20 thickness, $T_R$. The thickness of the slab 22 is labeled $T_S$. The tapered region 26 has a thickness labeled $T_T$. The thickness of the tapered region 26, $T_T$, tapers in a direction traveling away from the common region 14. In some instances, the thickness of the tapered region 26, $T_T$, tapers from the thickness of the common region 14, $T_C$, to about the thickness of the slab 22, $T_S$.

When a tapered region 26 is not present, a light signal incident on the region between the waveguides 12 can be reflected or scattered at the tapered region 26. The taper can be selected to reduce scattering and reflection. For instance, the taper of the tapered region 26 can be selected such that the light signal is directed into one of the waveguides 12 as illustrated by the arrow labeled G in FIG. 1A. Because the light signal is directed into a waveguide 12, the tapered region 26 is associated with a reduced level of optical loss compared to prior structures.

Figure 2A:
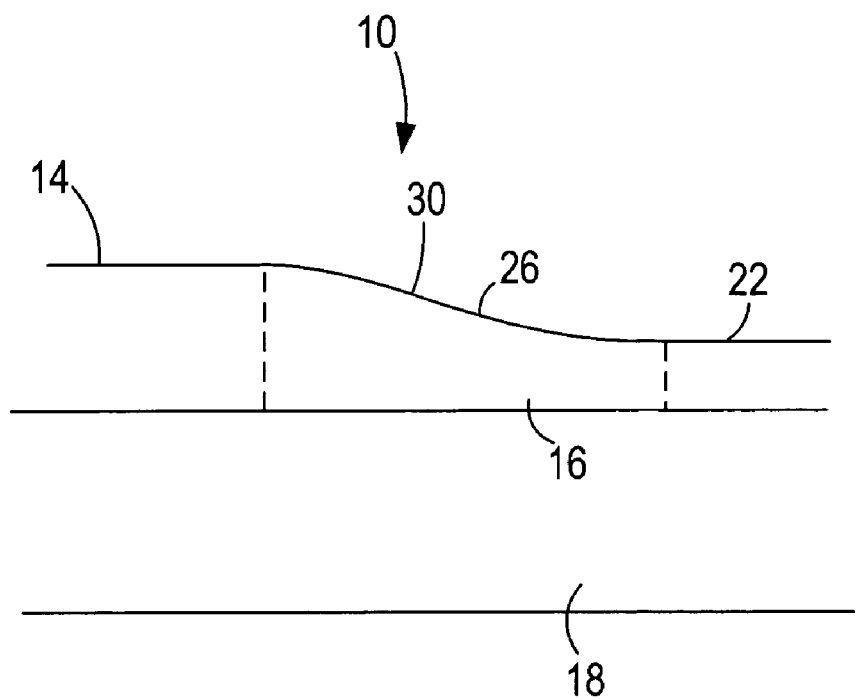
FIG. 2A is a longitudinal cross section of a tapered region. The surface of the curved region is curved along the length of the tapered region.

The tapered region 26 need not include a linear taper. For instance, FIG. 2A shows a longitudinal cross section of a tapered region 26. The surface 30 of the curved region is curved along the length of the tapered region 26. The curve can be selected to optimize the degree of scattering and reflection caused by the tapered region 26.

Figure 2B:
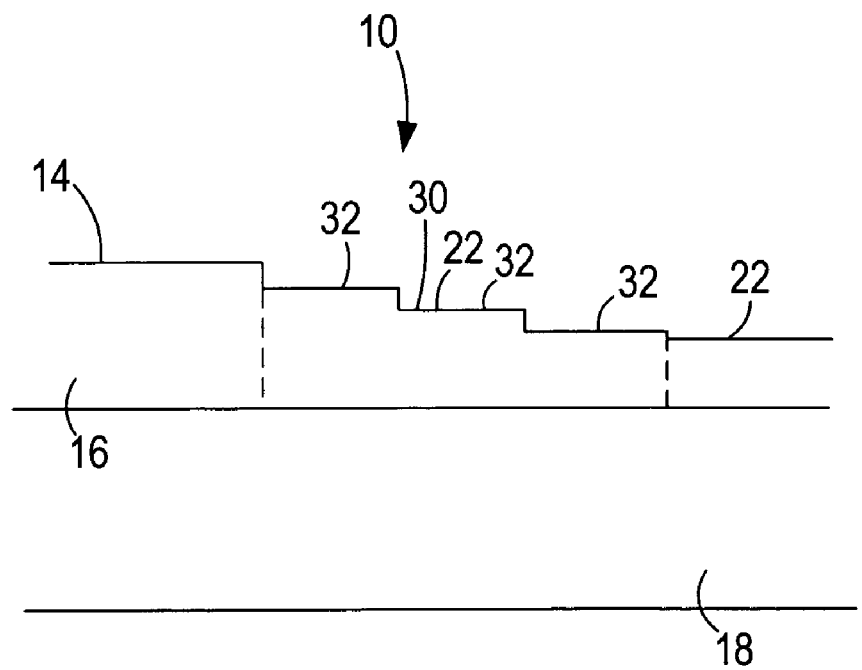
FIG. 2B is a longitudinal cross section of a tapered region. The tapered region tapers in a series of steps.

The taper of the tapered region 26 need not be continuous. FIG. 2B shows a longitudinal cross section of a tapered region 26. The tapered region 26 tapers in a series of steps 32. Although the steps 32 are shown as being parallel relative to the base 18, the steps 32 can be angled relative to the base 18.

Figure 2C:
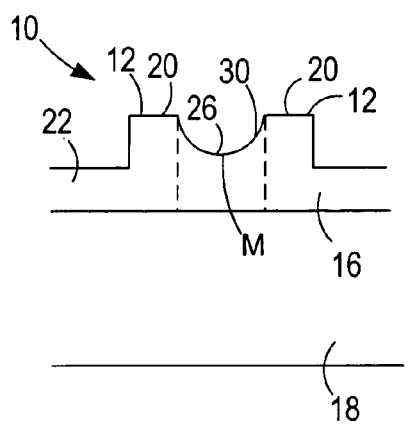
FIG. 2C is a lateral cross section of a tapered region. The thickness of the tapered region decreases moving from the interface of the tapered region and a waveguide toward the other waveguide. The thickness decreases such that the surface of the tapered region is curved along the width of the tapered region.

Although FIG. 1A through FIG. 1C illustrate the surface 30 of the tapered region 26 being parallel to the base 18 when moving away from a waveguide 12 along a lateral axis of the tapered region 26, the surface 30 of the tapered region 26 need not be parallel to be base 18 along the width of the tapered region 26. For instance, the thickness of the tapered region 26, $T_T$, can decrease moving away from at least one of the waveguides 12 along a lateral axis of the tapered region 26. FIG. 2C is a lateral cross section of a tapered region 26. The dashed lines shown in FIG. 2C each illustrate the interface of the tapered region 26 and a waveguide 12 and the point labeled M shows the midpoint between the waveguides 12. The thickness of the tapered region 26, $T_T$, decreases moving from the interface of each waveguide 12 and the tapered region 26 toward the midpoint between the waveguides 12. The thickness decreases such that the lateral profile of the surface 30 is curved.

Figure 2D:
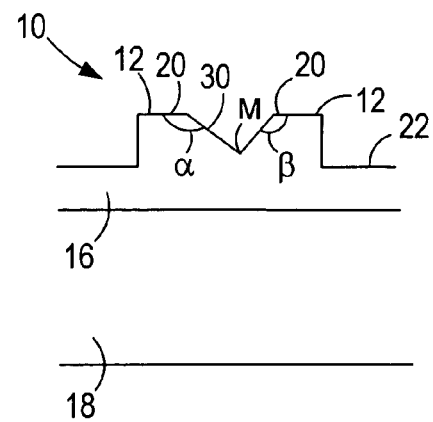
FIG. 2D is a lateral cross section of a tapered region. The thickness of the tapered region decreases moving from the interface of the tapered region and a waveguide toward the other waveguide. The thickness decreases such that the surface includes two straight regions along the width of the tapered region.

Although FIG. 2C illustrates the tapered region 26 constructed such that the lateral profile of the surface 30 is curved, the tapered region 26 can be constructed such that the surface 30 profile has two or more straight regions. For instance, FIG. 2D is a lateral cross section of the tapered region 26. The dashed lines shown in FIG. 2D illustrates the interface of the tapered region 26 and the waveguides 12 and the point labeled M shows the midpoint between the waveguides 12. The thickness of the tapered region 26, $T_T$, decreases moving away from the interface of each waveguide 12 and the tapered region 26 toward the midpoint between the waveguides 12 along a lateral axis of the tapered region 26. The thickness decreases such that the lateral profile of the surface 30 includes two straight regions. One straight region is formed at an angle α measured relative to the top of a waveguide 12 and another straight region is formed at an angle β measured relative to the top of another waveguide 12. The values of α and β can vary from a value of 180° at the common region 14 to 90° at the end of the tapered region 26. In some instances, the value of the angles α and β decrease linearly toward 90° moving away from the common region 14 along the longitudinal axis of the tapered region 26.

Figure 2E:
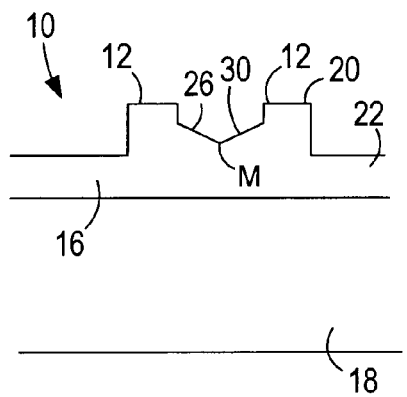
FIG. 2E is a lateral cross section of a tapered region. The tapered region extends from the sides of ridges that define the waveguide.
Figure 2F:
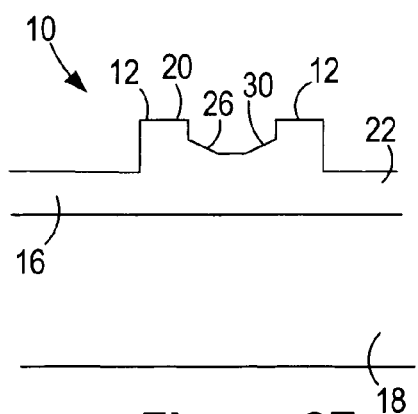
FIG. 2F is a lateral cross section of a tapered region. The tapered region extends from the sides of ridges that define the waveguide. A flat region is positioned between regions of the tapered region having a changing thickness along the width of the shared region.

Although FIG. 2C and FIG. 2D illustrate the surface 30 of the tapered region 26 extending from the top of the ridges 20, the tapered region 26 can extend from the sides of the ridge 20. FIG. 2E is a lateral cross section of a tapered region 26. The tapered region 26 extends from the sides of the ridges 20 that define the waveguide 12. In some instances, the height of the ridge 20 from which the tapered region 26 extends decreases moving away from the common region 14 along the longitudinal axis of the tapered region 26. In these instances, regions near the end of the tapered region 26 can have a lateral cross as shown in FIG. 2F. The tapered region 26 includes a flat portion positioned between regions of the tapered region 26 where the thickness changes along the width of the shared region.

FIG. 2C through FIG. 2E illustrate tapered regions 26 having a thickness that varies across the width of the tapered region 26. In each case the thickness of the tapered region 26, $T_T$, is shown decreasing to a minimum. This shape can serve to direct light signals into the waveguides 12. As a result, this shape can be associated with reduced loss. However, this shape is often associated with increased fabrication difficulties when compared to the tapered regions 26 having the lateral cross section shape illustrated in FIG. 1C through FIG. 1E.

Figure 2G:
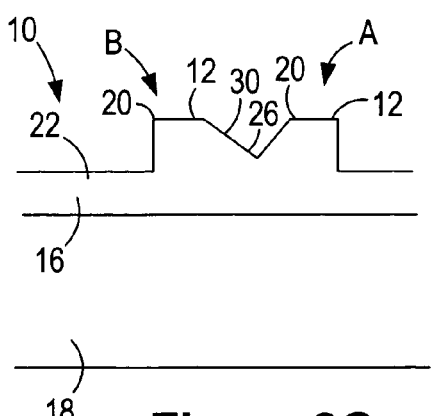
FIG. 2G is a lateral cross section of a tapered region. The thickness of the tapered region decreases moving from the interface of each waveguide and the tapered region. The minimum in the thickness is shifted toward the waveguide labeled A and away from the waveguide labeled B.

The minimum in the thickness in FIG. 2C through FIG. 2E is illustrated as being located at about the midpoint between the waveguides 12. However, the minimum in the thickness need not be positioned midway between the waveguides 12. FIG. 2G is a lateral cross section of a tapered region 26 where the minimum in the thickness is shifted toward the waveguide 12 labeled A and away from the waveguide 12 labeled B. The shift in the location of the minimum can cause the portion of the light signal received by the tapered region 26 to be shifted toward a particular waveguide 12. For instance, shifting the minimum away from a waveguide 12 can increase the intensity of the light signal that is received by that waveguide 12. For instance, shifting the minimum away from the waveguide 12 labeled A in FIG. 2G can increase the portion of a light signal that is directed to that waveguide 12.

Figure 3A:
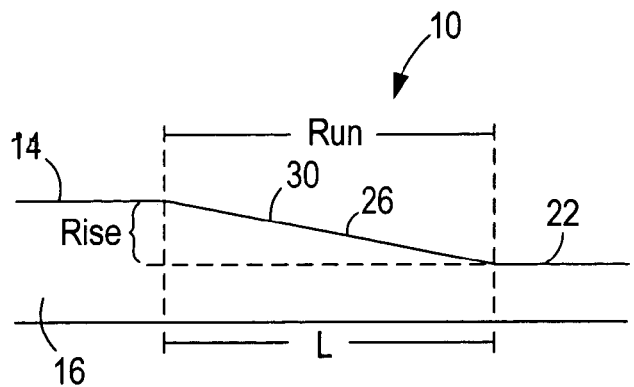
FIG. 3A and FIG. 3B are different perspectives of a tapered region that illustrate suitable dimensions of a tapered region.
Figure 3A:
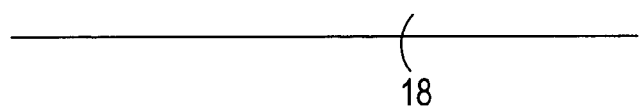

FIG. 3A is a longitudinal cross section of the tapered region 26. For instance, FIG. 3A could be a cross section of the tapered region 26 shown in FIG. 1A taken along a line extending between the brackets labeled B. The taper has a rise labeled "Rise". As noted above, the thickness of the tapered region 26, $T_R$, can taper from the thickness of the common region 14, $T_C$, to the thickness of the slab 22, $T_S$. Accordingly, the rise is often the thickness of the common region 14 adjacent to the tapered region 26, $T_C$, minus the thickness of the slab 22, $T_S$. A suitable rise includes, but is not limited to, a rise less than 2 μm, 5 μm, 8 μm or 14 μm and/or rises in the range of 0.5 μm to 14 μm, 2 μm to 10 μm or 5 μm to 8 μm.

Figure 3B:
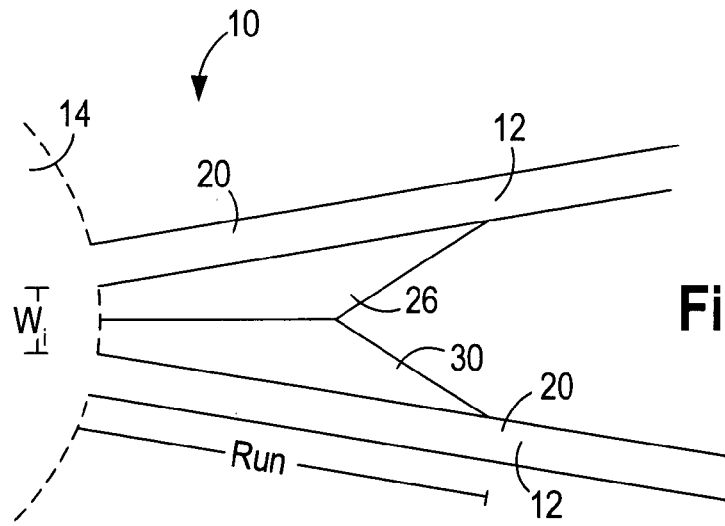

The tapered region 26 has a length labeled L in FIG. 3A. In some instances, the end of the tapered region 26 may not be straight. For instance, FIG. 3B is a topview of an optical component 10 having a tapered region 26 that is not straight at the end of the tapered region 26. A tapered region 26 with a lateral cross section structured as shown in FIG. 2C through FIG. 2G can result in a tapered region 26 having a topview as shown in FIG. 3B. In these instances, the run is the longest distance from the common region 14 to the end of the tapered region 26. A suitable length for the tapered region 26 includes, but is not limited to, lengths less than 600 μm, 1500 μm, or 2500 μm; lengths greater than 100 μm, 500 μm, 1000 μm or 1500 μm; and/or lengths in the range of 100 μm–2500 μm, 500 μm–2000 μm or 500 μm–1000 μm. A suitable ratio of the length to the rise are ratios less than 62, 300, 750, 1500; ratios greater than 25, 50, 100 or 300; and/or ratios in the range of 25–1500, 50–750 or 62–300.

The width of the tapered region 26 at the interface of the tapered region 26 and the common region 14 is labeled $W_i$ in FIG. 3B. Suitable distances for the width, Wi, include, but are not limited to, widths less than 1 μm, 2 μm or 10 μm.

Figure 4:
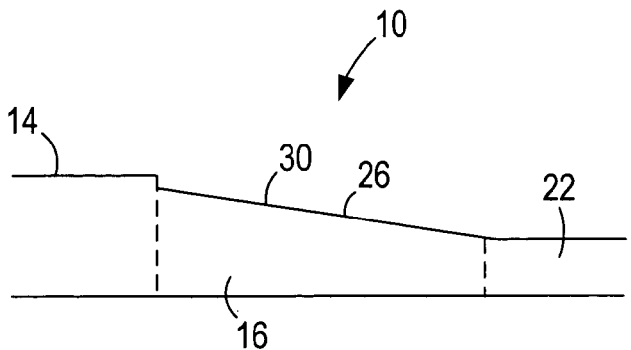
FIG. 4 shows a longitudinal cross section of a tapered region. The thickness of the tapered region adjacent to the common region is less than the thickness of the common region adjacent to the tapered region.
Figure 4:

The thickness of the tapered region 26, $T_T$, adjacent to the common region 14 can be different from the thickness of the common region 14 adjacent to the tapered region 26, $T_C$. For instance, FIG. 4 shows a longitudinal cross section of the tapered region 26 taken along the length of the tapered region 26. The thickness of the tapered region 26, $T_T$, adjacent to the common region 14 is less than the thickness of the common region 14 adjacent to the tapered region 26, $T_C$.

The tapered region 26 can be employed in a variety of different optical component 10 constructions. For instance, FIG. 5A is topview of a portion of an optical component 10 having a demultiplexer. The demultiplexer includes an input waveguide 40 in optical communication with an input star coupler 42. An array waveguide grating 44 connects the star coupler to an output star coupler 46. The output star coupler 46 includes a plurality of output waveguides 48 and the array waveguide grating 44 includes a plurality of array waveguides 50.

During operation of the demultiplexer, a light signal enters the input star coupler 42 from the input waveguide 40. The light signal can carry a plurality of channels that are each associated with a different wavelength. The input star coupler 42 distributes the light signal across the array waveguide grating 44 such that each array waveguide 50 receives a portion of the light signal. The array waveguide grating 44 carries the light signal portions to the output star coupler 46. The output star coupler 46 directs the light signal to the output waveguides 48. The array waveguide grating 44 is constructed such that channels associated with different wavelengths are directed to different output waveguides 48. As a result, different output waveguides 48 carry different channels.

The input star coupler 42 serves as a common region 14 from which the array waveguides 50 extend. Accordingly, a tapered region 26 can extend from the input star coupler 42 between adjacent array waveguides 50. The tapered regions 26 can reduce the loss associated with the transition from the input star coupler 42 to the array waveguide grating 44. The output star coupler 46 serves as a common region 14 from which the output waveguides 48 extend. Accordingly, a tapered region 26 can extend from the output star coupler 46 between adjacent output waveguides 48. The tapered regions 26 can reduce the loss associated with the transition from the output star coupler 46 to the output waveguides 48. The output star coupler 46 also serves as a common region 14 from which the array waveguides 50 extend. Accordingly, a tapered region 26 can extend from the output star coupler 46 between adjacent array waveguides 50. The tapered regions 26 can result in an improved distribution of the light signal through the output star coupler 46.

The tapered regions 26 need not be positioned between waveguides 12. A tapered region 26 can be positioned adjacent to a single as illustrated by the tapered regions 26 labeled A in FIG. 5A. The tapered regions 26 labeled A can increase the portion of the light signal that is directed into the array waveguides 50. Accordingly, these shared regions can reduce the loss associated with the demultiplexer.

Although FIG. 5A illustrates a demultiplexer having tapered regions 26 extending from the input star coupler 42 between array waveguides 50, and extending from the output star coupler 46 between output waveguides 48 and extending from the output star coupler 46 between array waveguides 50. A demultiplexer can have only a portion of the illustrated tapered regions 26. For instance, the demultiplexer can have only tapered regions 26 extending from the input star coupler 42 between array waveguides 50, extending from the output star coupler 46 between output waveguides 48 or extending from the output star coupler 46 between array waveguides 50. Additionally, the tapered regions 26 need not be positioned between each pair of adjacent array waveguides 50. For instance, a demultiplexer can include multiple pairs of adjacent array waveguides 50 but a single pair of array waveguides 50 can include a tapered region 26.

A tapered region 26 can also be employed in conjunction with a y-junction. Examples of optical components 10 where y-junctions are often employed include, but are not limited to, signal splitters, waveguide 12 taps and optical switches. FIG. 5B is topview of a portion of an optical component 10 having a y-junction. The y-junction includes an input waveguide 40, a first output waveguide 54 and a second output waveguide 56. During operation of the y-junction, a first portion of a light signal traveling along the input waveguide 40 enters the first output waveguide 54 and the second portion of the light signal enters the second output waveguide 56.

The input waveguide 40 serves as a common region 14 from which the first output waveguide 54 and the second output waveguide 56 extend. Accordingly, a tapered region 26 can extend from the input waveguide 40 between the first output waveguide 54 and the second output waveguide 56. The tapered region 26 can reduce the loss associated with the transition from the input waveguide 40 to the first output waveguide 54 and the second output waveguide 56.

Figure 6B:
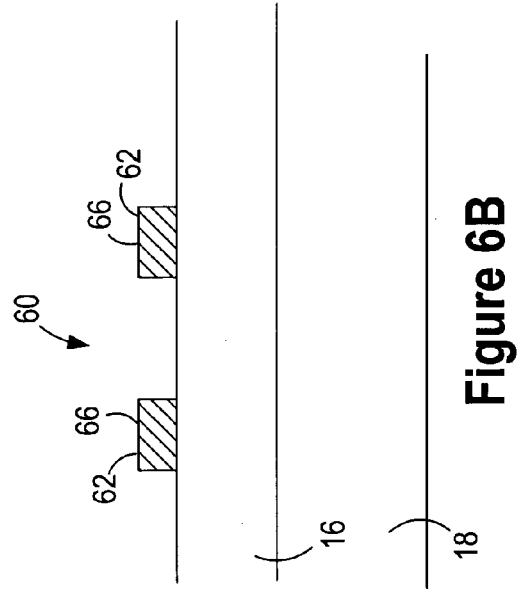
FIG. 6A through FIG. 6J illustrate a method of forming an optical component having a tapered region positioned between waveguides.
Figure 6D:
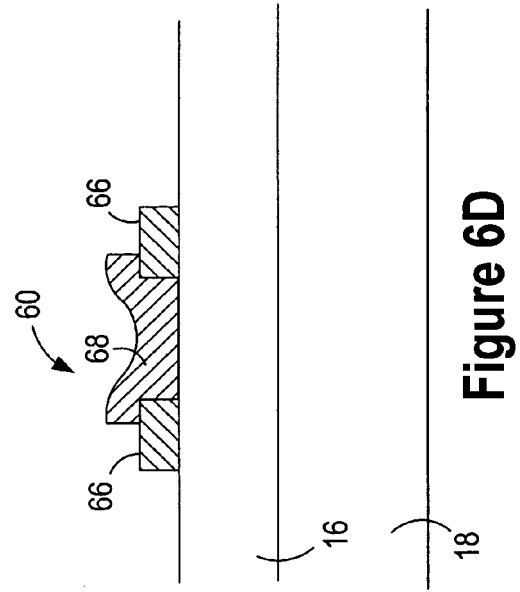
Figure 6A:
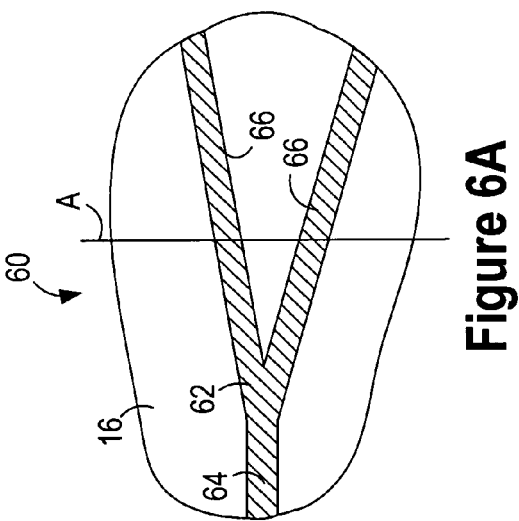

FIG. 6A through FIG. 6J illustrate a method of constructing an optical component 10 according to FIG. 1A through FIG. 1F. FIG. 6A is a topview of a component precursor 60 from which an optical component 10 will be constructed. FIG. 6B is a cross section of the component precursor 60 taken at the line labeled A in FIG. 6A. The component precursor 60 illustrated in FIG. 6A is a wafer. A suitable wafer includes, but is not limited to, a silicon-on-insulator wafer. A silicon on insulator wafer typically includes a silica layer between a layer of silicon and a silicon substrate. The layer of silicon serves as the light transmitting medium 16. The layer of silica serves to reflect light signals from the light transmitting medium 16 back into the light transmitting medium 16. Accordingly, the silica layer and the silicon substrate serve as the base 18 of the optical component 10.

A first mask 62 is formed on the component precursor 60 so as to protect regions of the component precursor 60 where the ridges 20 are to be formed. A common portion 64 of the first mask 62 protects regions of the component precursor 60 where the common region 14 is to be formed and a waveguide portion 66 of the first mask 62 protects regions of the component precursor 60 where waveguides 12 are to be formed. A suitable mask includes, but is not limited to, a hard mask. When the light transmitting medium 16 is silicon, a suitable hard mask includes, but is not limited to, a silica mask.

Suitable methods for forming a first mask 62 constructed of silica include, but are not limited to, growing silica on the component precursor 60. A photoresist is formed on the silica in a pattern that protects the regions of the component precursor 60 where the first mask 62 is to be formed. An anisotropic etch that removes the silica is performed and the photoresist removed. The regions of the silica protected by the photoresist remain on the component precursor 60 after the photoresist is removed.

Figure 6C:
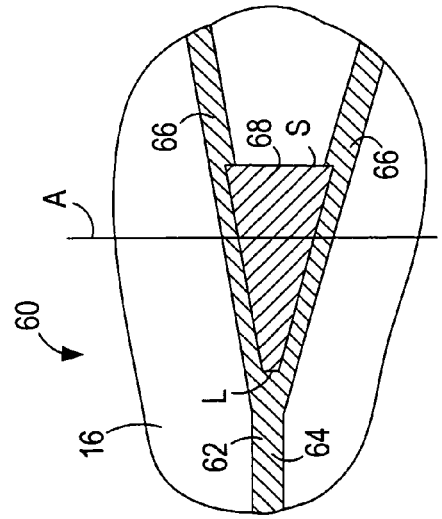

A second mask 68 is formed so as to provide the component precursor 60 illustrated in FIG. 6C and FIG. 6D. FIG. 6C is a topview of the component precursor 60 and FIG. 6D is a cross section of the component precursor 60 taken at the line labeled A in FIG. 6C. The second mask 68 is formed so as to protect the region of the component precursor 60 where the tapered region 26 is to be formed. Because the tapered region 26 extends away from a common region 14 between waveguides 12, the second mask 68 extends away from the common portion 64 of the first mask 62 between the waveguide portion 66 of the first mask 62. The second mask 68 can overlap the adjacent portions of the first mask 62 as evident in FIG. 6D.

Figure 6E:
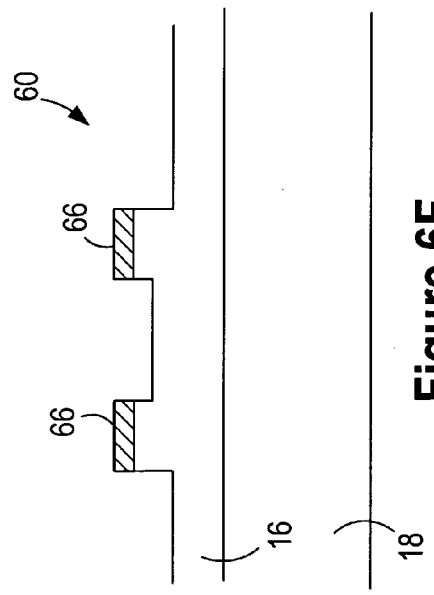
Figure 6F:
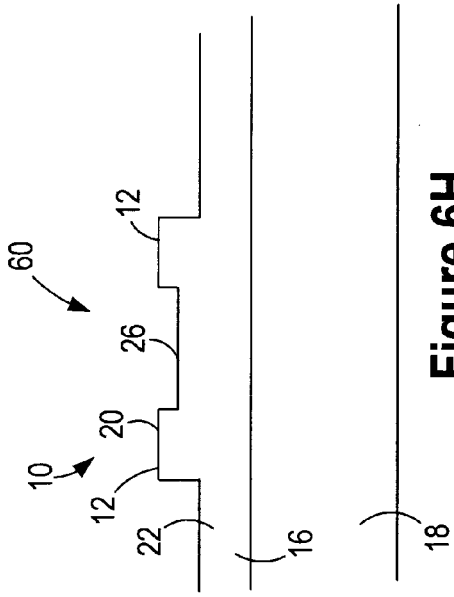

A first etch is performed so as to provide the component precursor 60 illustrated in FIG. 6E and FIG. 6F. FIG. 6E is a topview of the component precursor 60 and FIG. 6F is a cross section of the component precursor 60 taken at the line labeled A in FIG. 6E. The first etch forms the sides of the ridges 20 on the component precursor 60. Accordingly, the first etch is performed for a duration that provides the ridges 20 with the desired height.

A suitable first etch is an anisotropic etch including a dry etch such as a plasma etch. When the light transmitting medium 16 is silicon, the first mask 62 is silica and the second mask 68 is a photoresist, a suitable plasma etch includes $SF_6$, $O_2$ and $CF_4$ at a temperature of about 50–100° C. and a pressure of about 4–30 mTorr.

The first mask 62 and the first etch are selected such that the first etch does not etch through the first mask 62. As a result, the first mask 62 can be present on the component precursor 60 after the first etch as is shown in FIG. 6E and FIG. 6F. Because the first mask 62 remains in place through the duration of the first etch, the regions protected by the first mask 62 remain protected through the duration of the first etch. The resistance of the first mask 62 to the first etch can be a result of the thickness of the first mask 62 and/of the material(s) from which the first mask 62 are constructed. The first etch etches entirely through portions of the second mask 68. In some instances, the second mask 68 is entirely etched away during the first etch. As a result, the second mask 68 is not shown in FIG. 6E and FIG. 6F.

The second mask 68 is constructed so as to have a resistance to the first etch that varies along a length of the second mask 68 that is parallel to a longitudinal axis of the tapered region 26 that will be formed as a result of the second etch. The second mask 68 has a long duration end labeled L and a short duration end labeled S. The resistance of the second mask 68 to the first etch is less at the short duration end than at the long duration end. Because the resistance to the first etch is less near the short duration end of the second mask 68 than at the long duration end of the second mask 68, the first etch etches further into the light transmitting medium 16 under the short duration end of the send mask than under the long duration end of the second mask 68. Because the long duration end of the second mask 68 is adjacent to the common portion 64 of the first mask 62 and the short duration end is positioned away from the common portion 64 of the first mask 62, the thickness of the light transmitting medium 16 tapers in thickness traveling away from the common region 14.

The change in the resistance of the second mask 68 to the first etch between the short duration end and the long duration end provides the shape of the taper. For instance, if the change in the resistance to the first etch is substantially linear along the length of the second mask 68, the taper will be substantially straight as shown in FIG. 1B. As a result, the construction of the second mask 68 provides the tapered region 26 with the desired taper characteristics.

As noted above, the ridges 20 of the waveguides 12 are also formed during the first etch. Accordingly, the illustrated method is advantageous in that the waveguides 12 and the tapered regions 26 are formed concurrently. As noted above, the duration of the first etch is determined by the desired height of the ridges 20. Accordingly, the second mask 68 can be constructed with a thickness that causes the tapered region 26 to have the desired shape within the duration of the first etch.

Figure 6G:
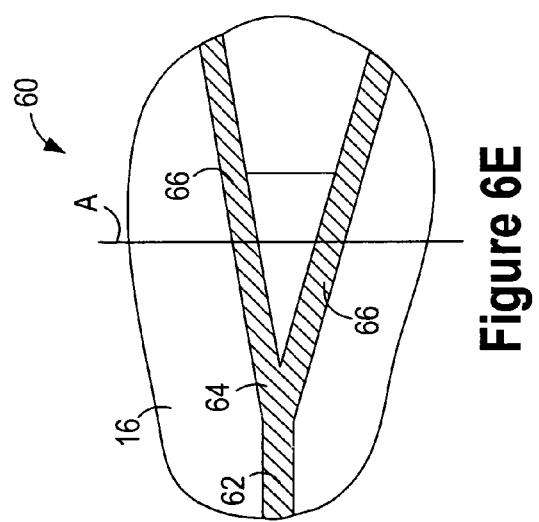
Figure 6H:
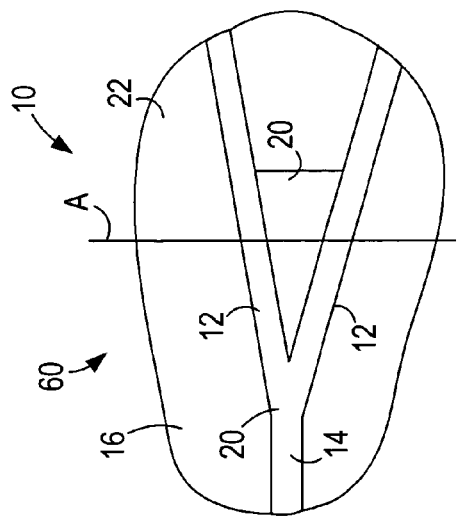

The first mask 62 is removed to provide the optical component 10 illustrated in FIG. 6G through FIG. 6H. FIG. 6G is a topview of the optical component 10 and FIG. 6H is a cross section of the optical component 10 taken at the line labeled A in FIG. 6G. When the first mask 62 is silica, a suitable method for removing the first mask 62 includes, but is not limited to, a wet etch.

Figure 6J:
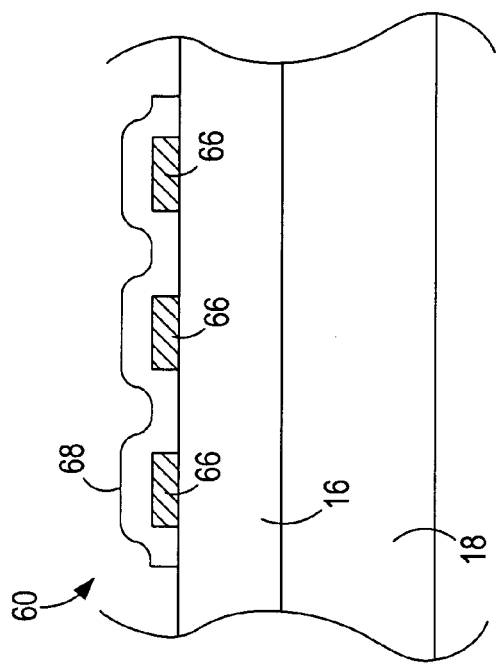
Figure 6I:
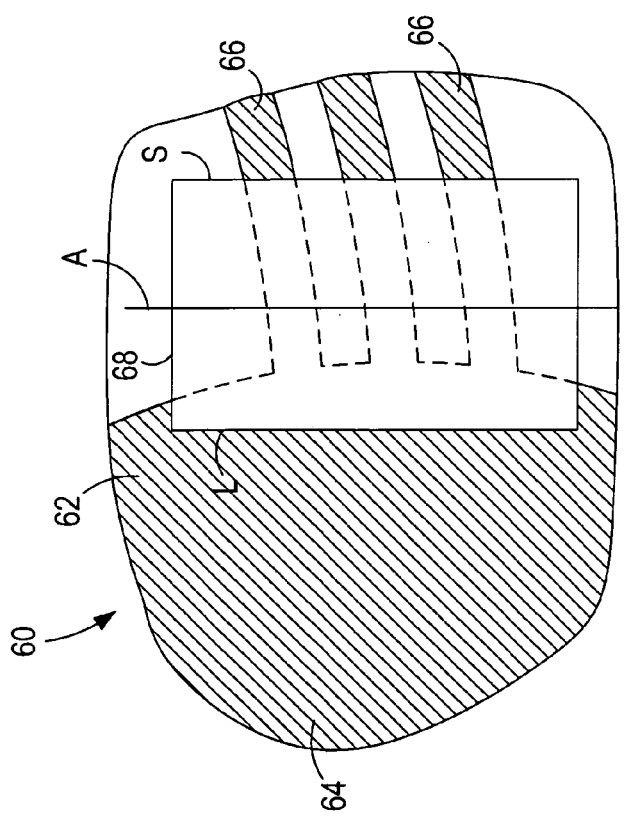

Although FIG. 6A through FIG. 6H is illustrated in the context of a y-junction, the method can be applied to form other components. For instance, FIG. 6I and FIG. 6J illustrate the component precursor of FIG. 6C and FIG. 6D adapted to formation of waveguides extending from a star coupler. FIG. 6I is a topview of a component precursor 60 and FIG. 6J is a cross section of the component precursor 60 taken at the line labeled A in FIG. 6I. The dashed lines in FIG. 6I illustrate the location of the first mask 62 under the second mask 68.

The first mask 62 is formed on the component precursor 60 so as to protect regions of the component precursor 60 where ridges are to be formed. The common portion 64 of the first mask 62 protects regions of the component precursor 60 where a star coupler is to be formed and a waveguide portion 66 of the first mask 62 protects the regions of the component precursor 60 where waveguides are to be formed. The second mask 68 is formed so as to protect the regions of the component precursor 60 where the tapered regions 26 are to be formed. The second mask 68 has a long duration end labeled L and a short duration end labeled S. The resistance of the second mask 68 to the first etch is less at the short duration end than at the long duration end.

As noted above, the first mask 62 protects regions of the component precursor 60 where waveguides to be formed. Because the waveguides are to be formed between tapered regions, the second mask 68 can extend over the waveguide portion 66 of the first mask 62 located between the regions of the component precursor 60 where the tapered regions are to be formed. Accordingly, a second mask 68 can be formed over a plurality of regions of the component precursor 60 where tapered regions 26 are to be formed. The first etch can be performed on the component precursor of FIG. 6I and FIG. 6J and the first mask removed to provide an optical component having waveguide extending from a star as shown in FIG. 5A.

Figure 7F:
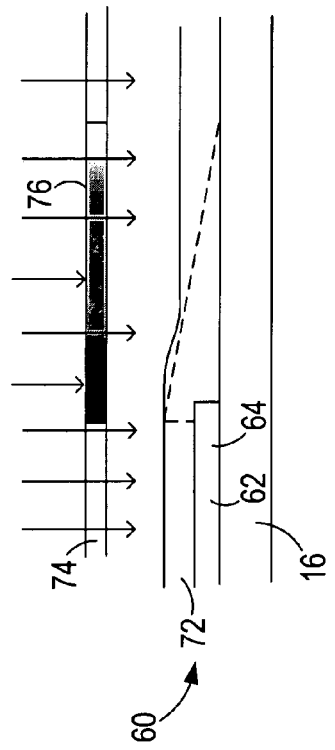

FIG. 7A through FIG. 7I illustrate a suitable method for generating the second mask 68 on a component precursor 60. FIG. 7A is a topview of a component precursor 60. FIG. 7B is a cross section of the component precursor 60 taken along the line labeled A and FIG. 7C is a cross section of the component precursor 60 taken along the line labeled B. A first mask 62 is formed on the component precursor 60 so as to protect regions of the component precursor 60 where ridges 20 are to be formed. A second mask precursor 72 is formed on the component precursor 60. As will become evident below, the second mask is formed from the second mask precursor 72. A suitable second mask precursor 72 includes, but is not limited to, a photoresist. The second mask precursor 72 is formed over the first mask 62 and the light transmitting medium 16. The dashed lines in FIG. 7A illustrate the location of the first mask 62 under the second mask precursor 72.

Suitable second mask precursors 72 are precursors that can be developed by exposing the second mask precursor to energy from an energy source 82. Developing a second mask precursor causes the second mask precursor to transition from a first state to a second state or from a first medium to a second medium. For the purposes of illustrating the following method, the second mask precursor is a photoresist and the energy source 82 is a light source. The light source can be employed to develop the photoresist. A suitable method of forming a photoresist on the component precursor 60 includes, but is not limited to, spin coating.

Figure 7E:
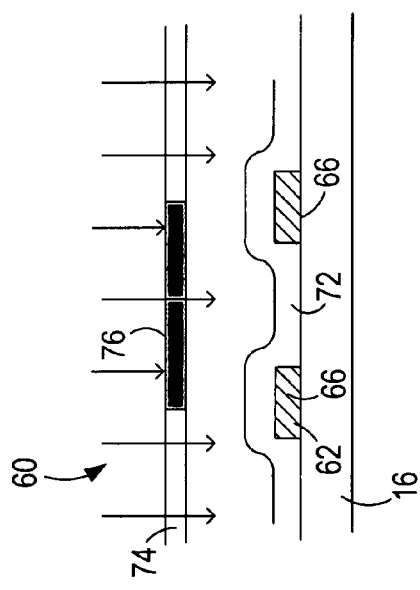

The component precursor 60 is exposed to light through a photomask 74 to develop a portion of the second mask precursor 72 as illustrated in FIG. 7D through FIG. 7F. FIG. 7D is a topview of the component precursor 60 having a photomask 74 positioned over the component precursor 60. The dashed lines in FIG. 7D illustrate the location of the first mask 62 under the photomask 74 and under the second mask precursor 72. FIG. 7E is a cross section of the component precursor 60 taken along the line labeled A in FIG. 7D. FIG. 7F is a cross section of the component precursor 60 taken along the line labeled B in FIG. 7D.

The photomask 74 includes a gray scale region 76 that is aligned with the portion of the component precursor 60 where the tapered region 26 is to be formed. The gray scale region 76 includes a length labeled $L_{gs}$. The gray scale region 76 is configured such that the intensity of the light transmitted through the gray scale region 76 changes along the length of the gray scale region 76, $L_{gs}$. For instance, the gray scale region 76 can be constructed so less light is transmitted through a low intensity end labeled L and more light is transmitted through a high intensity end labeled H. As a result, for a given duration of light exposure, the portion of the second mask precursor 72 positioned under the low intensity end of the gray scale region 76 receive less light than the portion of the second mask precursor 72 positioned under the high intensity end of the gray scale region 76. Accordingly, a thinner portion of the second mask 68 positioned under the low intensity end is developed than the portion of the second mask 68 positioned under the high intensity end, H. For instance, the dashed line in FIG. 7F can illustrate the pattern of development in the second mask precursor 72.

The portion of the photomask 74 outside of the gray scale region 76 can be highly transparent to the light. As a result, the portion of the second mask precursor 72 positioned outside of the region where the second mask 68 is to be formed is highly developed.

As noted above, the gray scale region 76 must be aligned with the portion of the component precursor 60 where the tapered region 26 is to be formed. However, the second mask 68 can overlap the adjacent portions of the first mask 62 as discussed with respect to FIG. 6D. As will be evident below, the portion of the second mask precursor 72 under the gray scale region 76 becomes the second mask 68. Because the second mask 68 can be formed over the adjacent first mask 62, the gray scale region 76 can be positioned over portions of the first mask 62 adjacent the portion of the component precursor 60 where the tapered region 26 is to be formed. As a result, the gray scale region 76 need only be aligned with the portions of the first mask 62 adjacent the portion of the component precursor 60 where the tapered region 26 is to be formed. Hence, the tolerance of alignment of the gray scale region 76 on the component precursor 60 is on the order of the narrowest portion of the first mask 62 adjacent to the portion of the component precursor 60 where the tapered region 26 is to be formed. Because the narrowest adjacent region of the first mask 62 is the waveguide portion 66 of the first mask 62, the alignment tolerance is on the order of the width of the waveguide portion 66 of the first mask 62. Because the waveguide portion 66 of the first mask 62 is often on the order of several microns wide, the alignment tolerance of the gray scale region 76 is generally on the order of several microns. Hence, the method is not associated with substantial alignment problems.

Figure 7H:
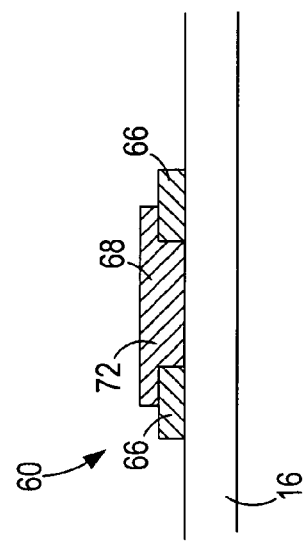
Figure 7G:
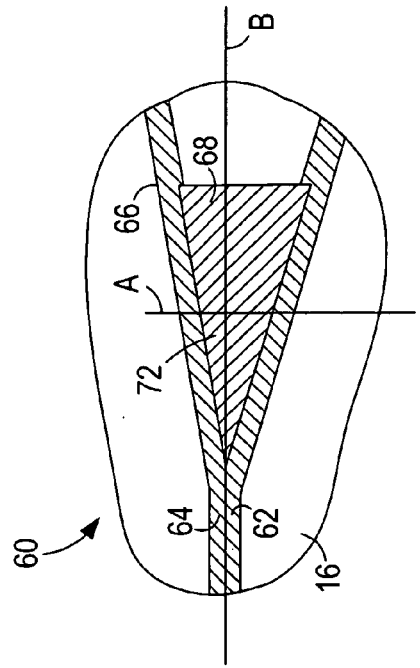
Figure 7I:
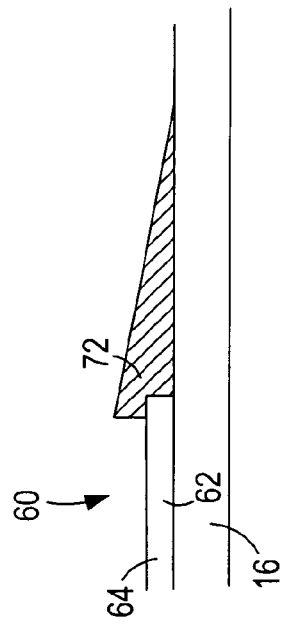

The developed portions of the second mask precursor 72 are removed to provide the component precursor 60 illustrated in FIG. 7G through FIG. 7I. FIG. 7G is a topview of the component precursor 60. FIG. 7H is a cross section of the component precursor 60 taken along the line labeled A in FIG. 7G. FIG. 7I is a cross section of the component precursor 60 taken along the line labeled B in FIG. 7G.

The undeveloped portions of the second mask precursor 72 remain in place on the component precursor 60. Accordingly, the portion of the second mask precursor 72 under the dashed line of FIG. 7E remains in place on the component precursor 60. The remaining second mask precursor 72 has a variable thickness along the length of the second mask precursor 72. The remaining second mask precursor 72 serves as the second mask 68 of the method disclosed in FIG. 6A through FIG. 6G.

The first etch discussed with respect to FIG. 6A through FIG. 6G etches through thinner portions of the second mask 68 more rapidly than through the thicker portions of the second mask 68. Accordingly, the resistance of the second mask 68 to the first etch is less at the thinner portions of the second mask 68 than at the thicker portions of the second mask 68. Hence, the thicker end of the second mask 68 serves as the long duration end and the thinner end serves as the short duration end.

As noted above, the shape of the taper results from the pattern of etch resistance of the second mask 68 along the length and width of the second mask 68. The gray scale region 76 of the photomask 74 can be varied to achieve the desired pattern of etch resistance and accordingly the desired shape of the tapered region 26. The transmission characteristics of the gray scale region 76 can be substantially constant across the width of the gray scale region 76. In some instances, the transmission characteristics of the gray scale region 76 vary across the width of the gray scale region 76. For instance, the gray scale region 76 can be constructed such that more light is transmitted midway across the width of the gray scale region 76 that at the edge of the gray scale region 76. The transmission characteristics can be varied across the width of the gray scale region 76 so as to produce a tapered region 26 with lateral cross sections such as the lateral cross sections illustrated in FIG. 2C through FIG. 2G.

Figure 8A:
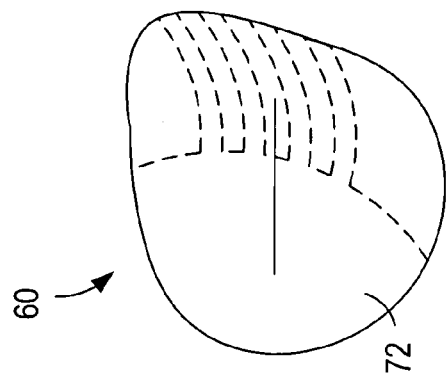
Figure 8C:
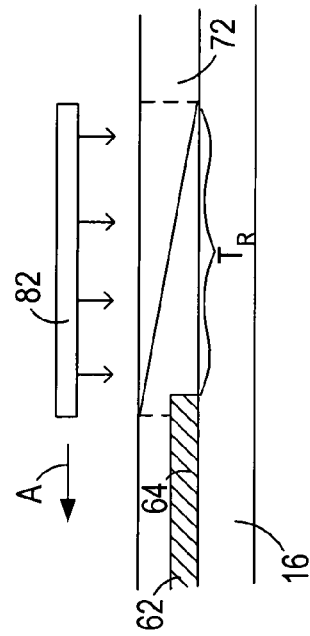
Figure 8B:

FIG. 8A through FIG. 8G illustrate a suitable method for generating a second mask 68 suitable for use with the method of FIG. 6A through FIG. 6J. FIG. 8A is a topview of a component precursor 60. FIG. 8B is a cross section of the component precursor 60 shown in FIG. 8A taken along the line labeled A. A layer of a second mask precursor 72 is formed on the component precursor 60. A suitable second mask precursor 72 includes, but is not limited to, a photoresist. The second mask precursor 72 is positioned over the first mask 62. The dashed lines in FIG. 8A illustrate the location of the first mask 62 under the second mask precursor 72.

FIG. 8C illustrates an energy source 82 positioned over a component precursor 60. The region of the component precursor 60 where a second mask 82 is to be formed is labeled $T_R$. As illustrated by the arrow labeled A, the energy source 82 is scanned over the region of the component precursor where the second mask 82 is to be formed, $T_R$. The energy source 82 is scanned toward the common portion 64 of the first mask 62. Once the second mask precursor 72 adjacent to the common portion 64 has been exposed to the energy for the desired period of time, the energy can be disrupted so the second mask precursor 72 adjacent to the common portion 64 is no longer exposed to the energy.

The scan causes different regions of the second mask precursor 72 to be exposed to energy from the energy source 82 for different periods of time. For instance, the portion of the second mask precursor 72 adjacent to the common portion 64 is exposed to the energy for a longer period of time than portions of the second mask precursor 72 remote from the common portion 64. As a result, the second mask precursor 72 remote from the common portion 64 is developed more deeply than the second mask precursor 72 adjacent to the common portion 64. For instance, the energy source 82 can be scanned so the line labeled B in FIG. 8C illustrates development pattern that results from the scan.

Figure 8D:
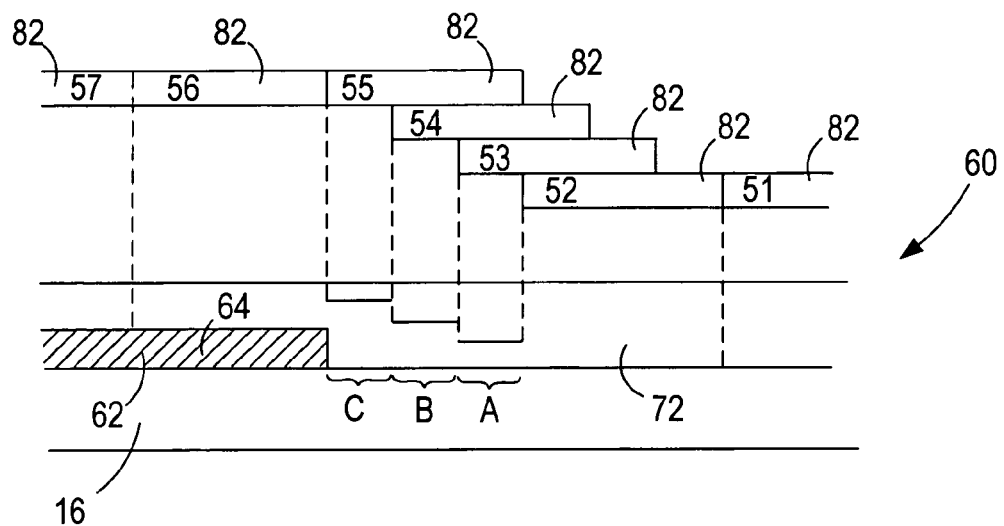

A suitable mechanism for scanning the energy source 82 includes, but is not limited to, a stepper. FIG. 8D illustrates the use of a stepper to scan a component precursor 60 such as the component precursor 60 illustrated in FIG. 8B. The horizontal position of the energy source 82 relative to the component precursor 60 is shown in seven sequential steps labeled $S_1$ through $S_7$. In order to simplify the illustration, the energy source 82 is shown as having a different height relative to the component precursor. However, a constant separation can be maintained between the energy source 82 and the component precursor 60 during operation of the energy source 82.

During steps $S_1$ and $S_2$, the energy source 82 is positioned over a portion of the second mask precursor 72 that is located outside the region of the component precursor where the second mask is to be formed. During these steps the second mask precursor 72 can be exposed to the energy for a duration sufficient to develop the second mask precursor down to the base 18.

During each of the steps $S_3$ through $S_5$, a portion of the energy source 82 is positioned over a region of the component precursor 60 where the second mask is to be formed. During each of these steps, the second mask precursor 60 is exposed to the energy for a duration that is not sufficient to develop the component precursor down to the base 18. The region of the second mask precursor 72 labeled A is exposed during step $S_3$ through $S_5$. The region of the second mask precursor 72 labeled B is exposed during step $S_4$ and $S_5$. The region of the second mask precursor 72 labeled C is exposed only during step $S_5$. As a result, the regions labeled A, B C are each exposed to the energy for respectively shorter periods of time. Hence, the second mask precursor 72 in the region labeled A is developed deeper than in the region labeled B and the second mask precursor 72 in the region labeled B is developed deeper than in the region labeled C.

The pattern of development in FIG. 8D approximates the desired pattern of development illustrated in FIG. 8C. Although FIG. 8D illustrates the use of three steps to develop the region where the second is to be formed, the duration of each step decreased and the number of steps increased to provide a higher degree of resolution. The increased resolution will bring the development pattern closer to the development pattern illustrated in FIG. 8C.

During steps $S_6$ and $S_7$, the energy source 82 is positioned over a portion of the second mask precursor 72 that is adjacent to the region of the component precursor 60 where the second mask is to be formed. During these steps the second mask precursor 72 can be exposed to the energy for a duration sufficient to develop the component precursor 72 down to the level of the base 18 and/or down to the level of the first mask 62.

Other mechanisms can be employed to scanning the energy source 82 over the second mask precursor. Further, the energy source need not be scanned in a series of steps as shown in FIG. 8D. For instance, a continous (analog) scan can be employ to provide the desired development profile.

Figure 8E:
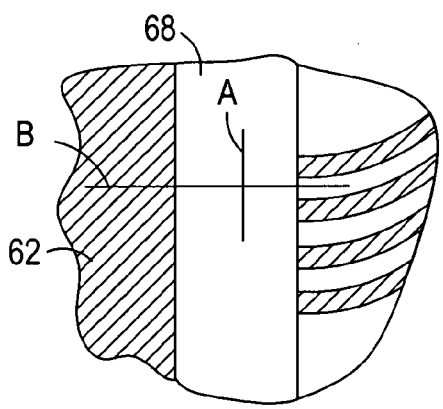
Figure 8F:
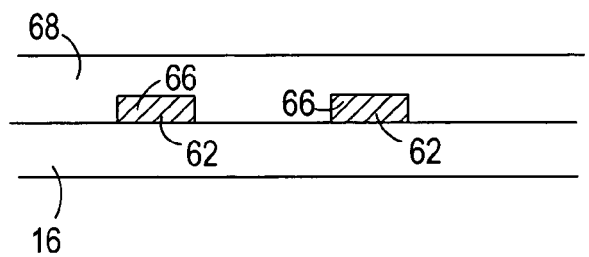

The developed portions of the second mask precursor 72 are removed to provide the component precursor 60 illustrated in FIG. 8E through FIG. 8G. FIG. 8E is a topview of the component precursor 60. FIG. 8F is a cross section of the component precursor 60 taken along the line labeled A in FIG. 8E. FIG. 8G is a cross section of the component precursor 60 taken along the line labeled B in FIG. 8E. The undeveloped portions of the second mask precursor remain in place on the component precursor 60. The remaining second mask precursor has a variable thickness along the length of the second mask precursor. Accordingly, the remaining second mask precursor serves as the second mask 68 discussed in the method of FIG. 6A through FIG. 6G.

The first etch discussed with respect to FIG. 6A through FIG. 6G etches through thinner portions of the second mask 68 more rapidly than through the thicker portions of the second mask 68. Accordingly, the resistance of the second mask 68 to the first etch is less at the thinner portions of the second mask 68 than at the thicker portions of the second mask 68. Hence, the thicker end of the second mask 68 serves as the long duration end and the thinner end serves as the short duration end.

The shape of the taper results from the rate that the energy source 82 is scanned across the low transmission portion of the photomask 74. In some instances, the scan rate is a constant through the scan. However, the scan rate can change so as to provide the desired shape of the tapered region 26 along the length of the tapered region 26. The transmission characteristics of the low transmission region 78 can be constant throughout the low transmission region 78. In some instances, the transmission characteristics of the low transmission region 78 vary across the width of the low transmission region 78. The transmission characteristics can be varied across the width of the low transmission region 78 so as to produce a tapered region 26 with lateral cross sections such as the lateral cross sections illustrated in FIG. 2C through FIG. 2G.

Scanning a energy source 82 can provide a higher degree of resolution than can be achieved with a photomask 74 having a gray scale region 76. As a result, the use of the scan can provide a smoother taper than can be achieved with a photomask 74 having a gray scale region 76.

Although the optical component is disclosed in the context of optical component having ridge waveguides, the principles of the present invention can be applied to optical devices having other waveguide types. Suitable waveguide types include, but are not limited to, buried channel waveguides and strip waveguide.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A method of forming an optical component, comprising:
    forming a first mask on an optical component precursor, the first mask including a plurality of waveguide portions each positioned to protect a waveguide region of the optical component precursor where a waveguide is to be formed extending from a common region;
    forming a second mask on the optical component precursor such that the second mask is at least partially positioned between waveguide portions of the first mask, a resistance of the second mask to etching varying along at least one dimension of the second mask, and the second mask being formed non-simultaneously with the first mask; and
    etching the optical component precursor with the first mask and the second mask in place on the optical component precursor so as to form the waveguides extending from the common region concurrently with forming a tapered region between the waveguides, the tapered region formed with a thickness that tapers in a direction moving away from the common region.

2. The method of claim 1, wherein the tapered region is connected to the common region.

3. The method of claim 1, wherein the etching is performed such that the etch does not etch through the first mask.

4. The method of claim 1, wherein the etching is performed so as to etch through the second mask for at least a portion of the second mask.

5. The method of claim 1, wherein the second mask has a thickness that varies along at least one dimension of the second mask.

6. The method of claim 1, wherein forming the second mask includes exposing a second mask precursor to light through a gray scale region of a photomask.

7. The method of claim 1, wherein the first mask and the second mask are formed so as to at least partially overlap one another.

8. The method of claim 1, wherein the second mask is formed so as to overlap portions of the first mask.

9. The method of claim 1, wherein the etching is performed such that the etch does not etch through the first mask and etches through the second mask for at least a portion of the second mask.

10. A method of forming an optical component, comprising:
   forming a first mask on an optical component precursor, the first mask including a plurality of waveguide portions each positioned to protect a waveguide region of the optical component precursor where a waveguide is to be formed;
   forming a second mask on the optical component precursor so as to protect a region of the optical component precursor positioned between the waveguide regions of the optical component precursor, a resistance of the second mask to etching varying along at least one dimension of the second mask, and the second mask being formed non-simultaneously with the first mask; and
   etching the optical component precursor with the first mask and the second mask in place on the optical component precursor so as to form the waveguides concurrently with forming a tapered region between the waveguides, the tapered region formed with a thickness that tapers.

11. The method of claim 10, wherein the etching is performed such that the etch does not etch through the first mask.

12. The method of claim 10, wherein the etching is performed so as to etch through the second mask for at least a portion of the second mask.

13. The method of claim 10, wherein the second mask has a thickness that varies along at least one dimension of the second mask.

14. The method of claim 10, wherein forming the second mask includes exposing a second mask precursor to light through a gray scale region of a photomask.

15. The method of claim 10, wherein the first mask and the second mask are formed so as to at least partially overlap one another.

16. The method of claim 10, wherein the second mask is formed so as to overlap portions of the first mask.

17. The method of claim 10, wherein at least a portion of the second mask is positioned between the waveguide portions of the first mask.

18. The method of claim 10, wherein the first masks is formed so as to protect a common region of the optical component precursor where a common region is to be formed such that the waveguides extend from the common region.

19. The method of claim 10, wherein the first mask include a common region portion arranged such that the waveguide portions extend from the common region portion.

20. The method of claim 10, wherein the etching is performed such that the etch does not etch through the first mask and etches through the second mask for at least a portion of the second mask.

21. The method of claim 1, wherein the second mask is of a different type than the first mask.

22. The method of claim 1, wherein the first mask is a hard mask.

* * * * *